US012136095B2

(12) United States Patent
Mohanty et al.

(10) Patent No.: US 12,136,095 B2
(45) Date of Patent: Nov. 5, 2024

(54) OPTIMIZED HARDWARE PRODUCT RETURNS FOR SUBSCRIPTION SERVICES

(71) Applicant: Dell Products L.P., Round Rock, TX (US)

(72) Inventors: Bijan Kumar Mohanty, Austin, TX (US); Dhilip Kumar, Bangalore (IN); Sujit Kumar Sahoo, Bangalore (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 17/659,904

(22) Filed: Apr. 20, 2022

(65) Prior Publication Data
US 2023/0342787 A1    Oct. 26, 2023

(51) Int. Cl.
*G06Q 30/00* (2023.01)
*G06N 3/08* (2023.01)
*G06Q 30/012* (2023.01)
*G06Q 30/014* (2023.01)

(52) U.S. Cl.
CPC ............ *G06Q 30/012* (2013.01); *G06N 3/08* (2013.01); *G06Q 30/014* (2013.01)

(58) Field of Classification Search
CPC ....... G06Q 30/012; G06Q 30/014; G06N 3/08
See application file for complete search history.

(56) References Cited

U.S. PATENT DOCUMENTS

| 9,791,514 B2 * | 10/2017 | Nishizawa | B60L 58/16 |
| 10,762,552 B2 * | 9/2020 | Natarajan | G06Q 30/0635 |
| 10,812,518 B1 * | 10/2020 | Belton, Jr. | G06F 9/44 |
| 2004/0236641 A1 * | 11/2004 | Abbott | G06Q 10/0631 |
| | | | 705/28 |
| 2014/0019001 A1 * | 1/2014 | Nishizawa | B60L 58/16 |
| | | | 701/31.9 |

(Continued)

OTHER PUBLICATIONS

Gomez, Virginia, et al. Collective Implementation of the Take-Back and Recycling Obligation for End-of-Life PV Panels: Experience of the European System. IEEE Explore, Electric Goes Green Conference, Berlin Germany, Sep. 2012. (Year: 2012).*

(Continued)

*Primary Examiner* — Luis A Brown
(74) *Attorney, Agent, or Firm* — DALY, CROWLEY, MOFFORD & DURKEE, LLP

(57) ABSTRACT

In one aspect, an example methodology implementing the disclosed techniques includes, by a product subscription service, receiving information regarding a hardware asset being returned at an end of a subscription and predicting, using a first machine learning (ML) model, whether the hardware asset has reached EOL. The method also includes, responsive to predicting that the hardware asset has reached EOL, creating, by the product subscription service, a work order to dispatch an eco-partner. The method may further include, by the product subscription service, responsive to predicting that the hardware asset has not reached EOL, predicting, using a second ML model, one or more new subscription orders matching the hardware asset and recommending the one or more matching new subscription orders as possible fits for the hardware asset.

20 Claims, 8 Drawing Sheets

(56) References Cited

U.S. PATENT DOCUMENTS

| | | | | |
|---|---|---|---|---|
| 2015/0269585 | A1* | 9/2015 | Patnam | G06Q 30/014 705/303 |
| 2016/0155056 | A1* | 6/2016 | Shiozaki | G06N 5/02 706/58 |
| 2017/0083822 | A1* | 3/2017 | Adendorff | G06F 11/0793 |
| 2019/0068738 | A1* | 2/2019 | Ganjam | H04L 41/0213 |
| 2019/0200244 | A1* | 6/2019 | Polepalli | G06N 20/00 |
| 2019/0385045 | A1* | 12/2019 | Poovalapil | G06N 3/048 |
| 2020/0265331 | A1* | 8/2020 | Tashman | G06N 7/01 |
| 2020/0265487 | A1* | 8/2020 | Silva | G06V 10/82 |
| 2021/0126845 | A1* | 4/2021 | Dinh | H04L 41/149 |
| 2021/0342199 | A1* | 11/2021 | Bhatnagar | G06F 9/5083 |
| 2022/0083987 | A1* | 3/2022 | Bhunia | G06Q 10/20 |
| 2022/0215435 | A1* | 7/2022 | Sueda | G06Q 30/0267 |
| 2023/0028266 | A1* | 1/2023 | Mohanty | G06N 20/20 |
| 2023/0342787 | A1* | 10/2023 | Mohanty | G06Q 30/014 |

OTHER PUBLICATIONS

Yla-Mella, Jenni, et al. "Implementation of Waste Electrical and Electronic Equipment Directive in Finland: Evaluation of the Collection Network and Challenges of the Effective WEEE Management." Resources, Conservation, and Recycling vol. 86, 2014, pp. 38-46. (Year: 2014).*

Jang, Yong-Chul, et al. "Management of Used & End-of-Life Mobile Phones in Korea: A Review." Resources, Conservation, and Recycling, vol. 55, 2010, pp. 11-19. (Year: 2010).*

Chen, Zhenghua, et al. "Machine Remaining Useful Life Prediction via an Attention-Based Deep Learning Approach." IEEE Transactions on Industrial Electronics, vol. 68, No. 3, Mar. 2021. (Year: 2021).*

Ahluwalia, Poonam, et al. "A Life Cycle Based Multi-Objective Optimization Model for the Management of Computer Waste." Resources, Conservation, and Recycling, vol. 51, 2007, pp. 792-826. (Year: 2007).*

\* cited by examiner

| Customer | Product | Part | Supplier | Manufacture Date | Manufacture Location | Customer Datacenter Location | Average CPU Utilization (%) | Average Memory Utilization (%) | Past Issues (Defects & Errors) | End-of-Life 0 = No 1 = Yes |
|---|---|---|---|---|---|---|---|---|---|---|
| | | | | | | | | | | |
| | | | | | | | | | | |
| | | | | | | | | | | |

FIG. 3

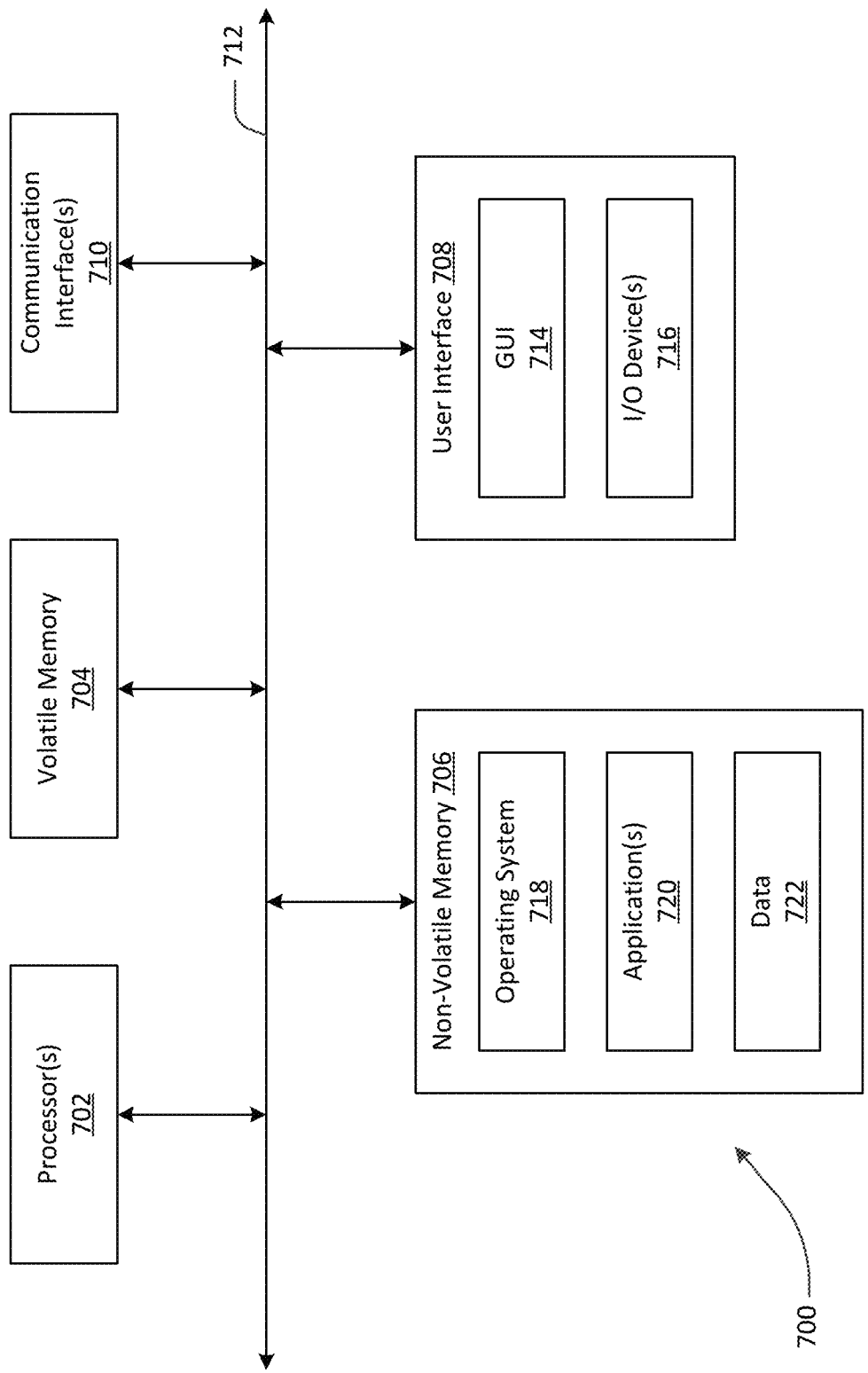

OPTIMIZED HARDWARE PRODUCT RETURNS FOR SUBSCRIPTION SERVICES

BACKGROUND

Enterprises that sell products are increasing adopting subscription-based business models. A subscription business model is a recurring revenue model in which a customer pays a weekly, monthly, or yearly fee in exchange for access to products or services. The customer can renew their subscriptions after a certain period. This subscription model allows enterprises to leverage their customer relationships to create a steady stream of income.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a product subscription service, receiving information regarding a hardware asset being returned at an end of a subscription and determining one or more relevant features from the information regarding the hardware asset, the one or more relevant features influencing prediction of an end-of-life (EOL). The method also includes, by the product subscription service, predicting, using a first machine learning (ML) model, whether the hardware asset has reached EOL based on the one or more relevant features and, responsive to predicting that the hardware asset has reached EOL, creating a work order to dispatch an eco-partner.

In some embodiments, the first ML model includes a deep neural network (DNN)-based classifier.

In some embodiments, the first ML model is trained using a modeling dataset generated from a corpus of historical asset recycling and reverse logistics data.

In some embodiments, the work order dispatches the eco-partner to a customer location to pick-up the hardware asset.

In some embodiments, the method further includes, by the product subscription service, responsive to predicting that the hardware asset has not reached EOL, predicting, using a second ML model, one or more subscription demands matching the hardware asset and recommending one or more new subscription orders associated with the predicted one or more subscription demands as possible fits for the hardware asset.

In some embodiments, the second ML model includes a k-nearest neighbor (k-NN) classifier.

In some embodiments, the one or more subscription demands are predicted using one of Euclidean distance, Manhattan distance, or Minkowsiki distance.

In some embodiments, the method also includes, by the product subscription service, responsive to selection of one of the recommended one or more new subscription orders, initiating a reverse logistics workflow for the selected one of the recommended one or more new subscription orders.

In some embodiments, the method also includes, by the product subscription service, responsive to selection of none of the recommended one or more new subscription orders, initiating a workflow for return of the hardware asset.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

According to another illustrative embodiment provided to illustrate the broader concepts described herein, a method includes, by a product subscription service, information regarding a subscription demand from a new subscription order and information regarding a plurality of returned hardware assets. The method also includes, by the product subscription service, predicting, using a machine learning (ML) model, one or more of the plurality of returned hardware assets matching the subscription demand, wherein the one or more of the plurality of returned hardware assets have not reached end-of-life (EOL). The method also includes, by the product subscription service, recommending the one or more matching returned hardware assets for use in fulfilling the new subscription order.

In some embodiments, the ML model includes a k-nearest neighbor (k-NN) classifier.

In some embodiments, the one or more returned hardware assets are predicted using one of Euclidean distance, Manhattan distance, or Minkowsiki distance.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 is a diagram illustrating a portion of a data structure that can be used to store information about relevant features of a modeling dataset for training a machine learning (ML) classification model to predict whether a hardware asset has reached end-of-life (EOL), in accordance with an embodiment of the present disclosure.

FIG. 7 is a block diagram illustrating selective components of an example computing device in which various aspects of the disclosure may be implemented, in accordance with an embodiment of the present disclosure.

DETAILED DESCRIPTION

Figure 1A:
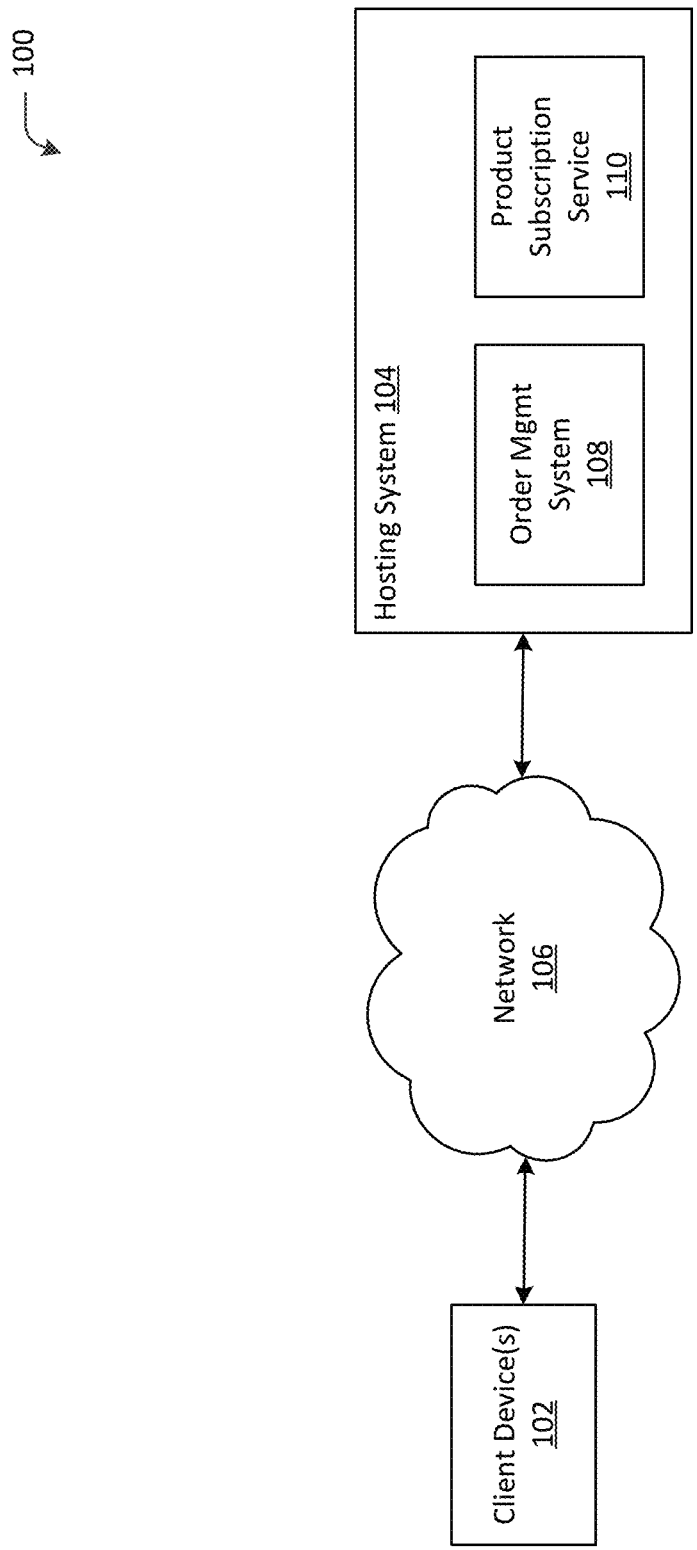
FIG. 1A is a block diagram of an illustrative network environment for optimized hardware product returns for subscription services, in accordance with an embodiment of the present disclosure.

Enterprises are increasingly transitioning to subscription-based offers. Subscription-based offers are typically generated based on products that an enterprise would like to sell or products that a customer explicitly identifies (e.g., indicates an interest in having access to). For example, cloud service providers are offering scalable computing resources under various subscriptions (e.g., software as a service (SaaS)) where customers are billed based on actual resource consumption. While SaaS is understood to be one of numerous popular subscription models, increasing numbers of enterprises are offering hardware products ("hardware assets"), such as computer systems and other computing devices, as a subscription. A primary challenge is how to process the return of hardware products at the end of subscriptions. For example, when a customer upgrades, cancels or ends (e.g., terminates) a subscription, the hardware products offered under the subscription may be returned to an enterprise's warehouse (e.g., enterprise's fulfillment center). The enterprise can then use the returned hardware products as supply for another subscription (e.g., another subscription demand). Such effort to process the return to the fulfillment center and reuse of the hardware product can be time consuming for the enterprise and result in increased resource usage by computing devices (e.g., enterprise systems such as enterprise resource planning (ERP), supply chain management (SCM), and customer relationship management (CRM) systems) used to process the return and reassignment of the hardware product. What is needed is a way to more effectively process hardware product subscription offers at the end of subscriptions.

Certain embodiments of the concepts, techniques, and structures disclosed herein are directed to an artificial intelligence (AI)/machine learning (ML)-powered framework for processing hardware product subscription offers at the end of the subscriptions. In some embodiments, processing of hardware assets being returned at the end of subscriptions is facilitated by training a classification algorithm (e.g., a dense neural network (DNN)-based classification algorithm) using machine learning techniques to predict whether a hardware asset being returned has reached end-of-life (EOL). Such hardware assets being returned at the end of subscriptions (e.g., at the end of hardware subscriptions) is sometimes referred to herein as "returned hardware assets" (or a "returned hardware asset" in the singular). If the prediction using the machine learning (ML) classifier is that the returned hardware asset has reached EOL, a recycling workflow may be initiated to recycle the hardware asset. For example, a work order can be created to dispatch an eco-partner to the customer location to pick-up (e.g., collect) the hardware asset. Dispatching the eco-partner to the customer location can significantly reduce the amount of network and/or processing resources (e.g., processing performed on the enterprise systems) since there is no need for generating and/or tracking multiple shipments of the hardware asset (e.g., shipment of the hardware asset from the customer location to the fulfillment center and from the fulfillment center to the eco-partner for recycling).

Otherwise, if the prediction is that the returned hardware asset has not reached EOL, the returned hardware asset may be matched to new subscription orders for hardware assets from the enterprise's customers that need to be fulfilled. Such hardware assets being ordered under the new subscriptions is sometimes referred to herein as "subscription demands" or "asset demands." In some embodiments, ML may be utilized for matching a returned hardware asset with the subscription demands from new subscription orders. For example, in one embodiment, a learning algorithm (e.g., k-nearest neighbor (k-NN) algorithm) and a distance similarity measure algorithm (e.g., Euclidean distance, Manhattan distance, or Minkowsiki distance) may be trained using machine learning techniques to predict matches between a returned hardware asset and subscription demands. The ML model (e.g., the k-NN classifier) can be used to predict subscription demands (e.g., k subscription demands) that most closely match a returned hardware asset. The predicted most closely matching subscription demands can then be recommended to the enterprise as possible fits for the returned hardware asset. If a matching subscription demand is selected, a reverse logistics workflow may be initiated to move the hardware asset from the old customer location (e.g., location of customer ending the subscription and returning the hardware asset) to a new customer location (e.g., location of customer placing the new subscription order associated with the matching subscription demand). Moving the hardware asset from the old customer location to the new customer location can also significantly reduce the amount of processing resources since there is no need to move the hardware asset from the old customer to the enterprise, maintaining the hardware asset within the enterprise systems, and moving the hardware asset from the enterprise to the new customer.

In some embodiments, a matching of returned hardware assets (e.g., hardware assets returned to the enterprise) to subscription demands may be performed in response to receiving a new subscription order for a hardware asset (e.g., in response to a new subscription order for a hardware asset being placed with the enterprise). Here, the returned hardware assets may include the hardware assets that have already been returned to the enterprise and the hardware assets from soon-to-end subscriptions (e.g., hardware assets from subscriptions that will end within a predetermined period). For example, when a new subscription order for a hardware asset is received, a ML model (e.g., the k-NN classifier) may be used to predict returned hardware assets that most closely match the hardware asset being ordered under the new subscription. The most closely matching returned hardware assets can then be recommended to the enterprise for use in fulfilling the new subscription order.

Turning now to the figures, FIG. 1A is a block diagram of an illustrative network environment 100 for optimized hardware product returns for subscription services, in accordance with an embodiment of the present disclosure. As illustrated, network environment 100 may include one or more client devices 102 communicatively coupled to a hosting system 104 via a network 106. Client devices 102 can include smartphones, tablet computers, laptop computers, desktop computers, workstations, or other computing devices configured to run user applications (or "apps"). In some implementations, client device 102 may be substantially similar to a computing device 700, which is further described below with respect to FIG. 7.

Hosting system 104 can include one or more computing devices that are configured to host and/or manage applications and/or services. Hosting system 104 may include load balancers, frontend servers, backend servers, authentication servers, and/or any other suitable type of computing device. For instance, hosting system 104 may include one or more computing devices that are substantially similar to computing device 700, which is further described below with respect to FIG. 7.

In some embodiments, hosting system 104 can be provided within a cloud computing environment, which may also be referred to as a cloud environment, cloud computing or cloud network. The cloud computing environment can provide the delivery of shared computing services (e.g., microservices) and/or resources to multiple users or tenants. For example, the shared resources and services can include, but are not limited to, networks, network bandwidth, servers, processing, memory, storage, applications, virtual machines, databases, software, hardware, analytics, and intelligence.

As shown in FIG. 1A, hosting system 104 may include an order management system 108 and a product subscription service 110. Order management system 108 is generally configured to provide product order lifecycle management for an organization that offers (e.g., sells) subscriptions. For example, when a customer orders a new subscription for a hardware product(s), the organization can use order management system 108 to track the information and processes, such as order entry, inventory management, fulfillment, and after-sales service, associated with the new subscription order (i.e., the subscription demand). Similarly, when a customer cancels (e.g., terminates) an existing subscription, the organization can use order management system 108 to track the information and processes associated with the subscription cancellation order. As described in further detail at least with respect to FIGS. 1B-6, product subscription service 110 is generally configured to provide a framework for processing hardware product returns at the end of the subscriptions and/or new subscription orders for hardware assets.

Network 106 may correspond to one or more wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, the Internet, and/or any other suitable type of communications network. In some embodiments, network 106 may include another network or a portion or portions of other networks.

Figure 1B:
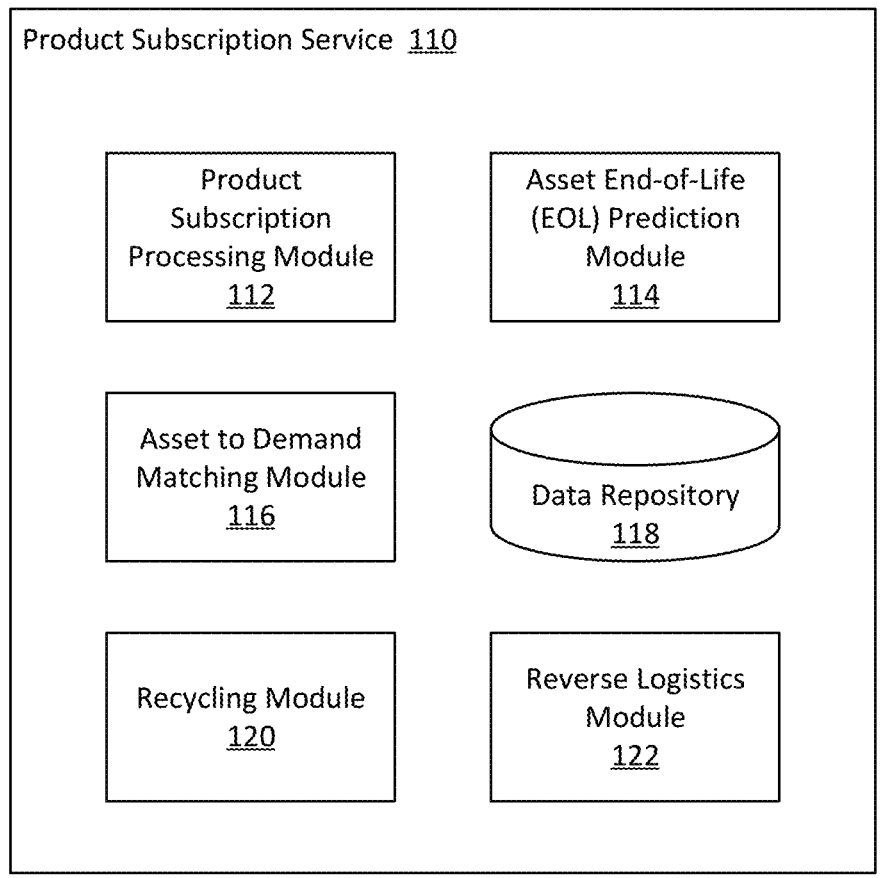
FIG. 1B is a block diagram of an illustrative product subscription service, in accordance with an embodiment of the present disclosure.

FIG. 1B is a block diagram of product subscription service 110, in accordance with an embodiment of the present disclosure. An organization such as a company, an enterprise, or other entity that offers subscriptions, for instance, may implement and use the framework of product subscription service 110 to process subscriptions for its hardware products. For example, order management system 108 may send or otherwise provide information regarding canceled subscriptions, including information regarding the customer canceling the subscription and the hardware asset(s) that are being returned, to product subscription service 110. Order management system 108 may also send or otherwise provide information regarding new subscription orders, including information regarding the customer ordering the subscription and the hardware asset(s) that are being ordered under the new subscription, to product subscription service 110. Product subscription service 110 can be implemented as computer instructions executable to perform the corresponding functions disclosed herein. Product subscription service 110 can be logically and/or physically organized into one or more components. The various components of product subscription service 110 can communicate or otherwise interact utilizing application program interfaces (APIs), such as, for example, a Representational State Transfer (RESTful) API, a Hypertext Transfer Protocol (HTTP) API, or another suitable API, including combinations thereof.

In the example of FIG. 1B, product subscription service 110 includes a product subscription processing module 112, an asset end-of-life (EOL) prediction module 114, an asset to demand matching module 116, a data repository 118, a recycling module 120, and a reverse logistics module 122. Product subscription service 110 can include various other components (e.g., software and/or hardware components) which, for the sake of clarity, are not shown in FIG. 1B. It is also appreciated that product subscription service 110 may not include certain of the components depicted in FIG. 1B. For example, in certain embodiments, product subscription service 110 may not include one or more of the components illustrated in FIG. 1B (e.g., recycling module 120), but product subscription service 110 may connect or otherwise couple to the one or more components via a communication interface. Thus, it should be appreciated that numerous configurations of product subscription service 110 can be implemented and the present disclosure is not intended to be limited to any particular one. That is, the degree of integration and distribution of the functional component(s) provided herein can vary greatly from one embodiment to the next, as will be appreciated in light of this disclosure.

Referring to product subscription service 110, product subscription processing module 112 is configured to process hardware assets being returned by customers at the end of subscriptions. For example, in response to receiving information regarding a returned hardware asset (e.g., information regarding a hardware asset being returned by a customer at an end of a subscription), product subscription processing module 112 can determine whether the returned hardware asset has reached EOL. In some embodiments, product subscription processing module 112 can utilize asset EOL prediction module 114 to determine whether the returned hardware asset has reached EOL. If the determination (e.g., prediction) is that the returned hardware asset has reached EOL, product subscription processing module 112 can initiate a recycling workflow for the returned hardware asset. For example, in one embodiment, product subscription processing module 112 can create (e.g., generate) a work order to dispatch an eco-partner to recycle the returned hardware asset. In some embodiments, product subscription processing module 112 can utilize recycling module 120 to create the work order to dispatch an eco-partner to pick-up the returned hardware asset at its current location and to recycle the returned hardware asset (e.g., create a work order to collect the hardware asset at the customer location and to recycle the hardware asset).

If the determination is that the returned hardware asset has not reached EOL, product subscription processing module 112 can determine whether there is a match between the returned hardware asset and subscription demands from new subscription orders that need to be fulfilled. In other words, product subscription processing module 112 can determine whether the returned hardware asset can be reused for (e.g., to fulfill) a new subscription order for a hardware asset. In some embodiments, product subscription processing module 112 can utilize asset to demand matching module 116 to predict (e.g., determine) a predetermined number, N, subscription demands that most closely match the returned hardware asset. The value of N may be configurable by the organization. Product subscription processing module 112 can then return (or "output") information regarding the predicted N most closely matching subscription demands to product subscription service 110. In response to such information being received, product subscription service 110 can determine the new subscription orders associated with the predicted N most closely matching subscription demands and recommend the determined new subscription orders as possible fits for reusing the returned hardware asset. For example, in one embodiment, product subscription service 110 may send the information regarding the new subscription orders associated with the predicted N most closely matching subscription demands to order management system 108 as recommended possible fits for reusing the returned hardware asset.

A determination can then be made as to whether one of the recommended new subscription orders is suitable for reusing the returned hardware asset. If a particular one of the recommended new subscription orders is determined to be suitable for reusing the returned hardware asset, a reverse logistics workflow may be initiated to reuse the returned hardware asset for that particular new subscription order. For example, in one embodiment, reverse logistics module 122 can be utilized to initiate a reverse logistics workflow to reuse the returned hardware asset (e.g., ship the returned hardware asset from its current location to a new customer location specified by that particular new subscription order). Otherwise, if none of the recommended new subscription orders is determined to be suitable for reusing the returned hardware asset, a workflow for the return of the returned hardware asset may be initiated to return the hardware asset to the organization. For example, in one embodiment, the workflow may be to ship the returned hardware asset to a fulfillment center/site of the organization.

In some embodiments, product subscription processing module 112 may be configured to process new subscription orders for hardware assets received by the organization. For example, in response to receiving information regarding a new subscription order for a hardware asset, for example, from product subscription service 110, product subscription processing module 112 can determine the returned hardware assets that are available for use in fulfilling the new subscription order. Such returned hardware assets may include the hardware assets that have already (e.g., actually) been returned to the organization by customers at the end of subscriptions and the hardware assets that are expected to be returned to the organization from soon-to-end subscriptions (e.g., hardware assets from subscriptions that will end within a predetermined period). Product subscription processing module 112 can then determine which of the returned hardware assets have reached EOL. In some embodiments, for a particular returned hardware asset, product subscription processing module 112 can utilize asset EOL prediction module 114 to determine whether the returned hardware asset has reached EOL. If the determination (e.g., prediction) is that the returned hardware asset has reached EOL, product subscription processing module 112 can initiate a recycling workflow for the returned hardware asset. For example, if the returned hardware asset is a hardware asset that is in the possession of the organization (e.g., the hardware asset has already been returned to the organization), product subscription processing module 112 can utilize recycling module 120 create (e.g., generate) a work order to dispatch an eco-partner to recycle the returned hardware asset. If the returned hardware asset is a hardware asset that is at a customer location, product subscription processing module 112 can utilize recycling module 120 to create the work order to dispatch an eco-partner to pick-up the returned hardware asset at the customer location and to recycle the returned hardware asset. In this manner, product subscription processing module 112 is able to remove (e.g., eliminate) from the available returned hardware assets the hardware assets that have reached EOL and are not suitable for fulfilling the new subscription order.

From the returned hardware assets that have not reached EOL (e.g., the returned hardware assets that are suitable for use in fulfilling the new subscription order), product subscription processing module 112 can determine a predetermined number, K, returned hardware assets that most closely match the hardware asset being ordered under the new subscription order (i.e., the subscription demand). The value of K may be configurable by the organization. In other words, product subscription processing module 112 can determine whether there are returned hardware assets that can be reused to fulfill the new subscription order. In some embodiments, product subscription processing module may utilize machine learning techniques, such as, for example, the machine learning techniques utilized implemented by asset to demand prediction module 116, to predict (e.g., determine) K returned hardware assets that most closely match the subscription demand. For example, a nearest neighbor algorithm and a distance measure (e.g., Euclidian distance) may be used to match the features of the individual returned hardware assets and the subscription demand. The features can include customer, customer location, product model, product capacity, product configuration, date of the new subscription order, etc. Product subscription processing module 112 can then return information regarding the determined K most closely matching returned hardware assets to product subscription service 110 as recommended hardware assets for use in fulfilling the new subscription order. In one embodiment, product subscription service 110 may send the information regarding one or more of the predicted K most closely matching returned hardware assets to order management system 108 as recommended possible hardware assets for use in fulfilling the new subscription order.

Asset EOL prediction module 114 is operable to predict whether a hardware asset (e.g., returned hardware asset) has reached EOL. To this end, in some embodiments, asset EOL prediction module 114 can include a classification algorithm (e.g., a dense neural network (DNN)-based classification algorithm) that is trained and tested using machine learning techniques with a modeling dataset generated from historical recycling and reverse logistics data of the organization's assets (e.g., hardware assets). Such recycling and reverse logistics data for a particular hardware asset may include multi-dimensional features, such as, customer, product, product model, parts, suppliers, manufacturing location, and date of manufacturing, to provide a few examples, and an end-of-life outcome of the particular product. Examples of relevant features of the modeling dataset for the ML classification model of asset EOL prediction module 114 is provided below with respect to FIG. 3. Once the classification learning algorithm is trained, the ML classification model of asset EOL prediction module 114 can, in response to input of a returned hardware asset (e.g., a hardware product being returned to the organization at the end of a subscription), predict whether the returned hardware asset has reached EOL based on the learned behaviors (or "trends") in the modeling dataset. For example, for a given returned hardware asset for which an EOL prediction is desired, product subscription processing module 112 can use information regarding the returned hardware asset to generate a feature vector that represents relevant features (or "attributes") of the returned hardware asset, such as some or all the variables that may influence the prediction of whether the returned hardware asset has reached EOL. The generated feature vector can then be input to the ML classification model which outputs a prediction of whether the returned hardware asset represented by the input feature vector has reached EOL. Further description of the training of the classification algorithm implemented within asset EOL prediction module 114 is provided below at least with respect to FIG. 4.

Asset to demand matching module 116 is operable to determine the subscription demands from new subscription orders that most closely match a returned hardware asset when provided details regarding the subscription demands and the returned hardware asset. Such details may include multi-dimensional features of the returned hardware asset as well as multi-dimensional features of the subscription demands from the new subscription orders, such as, product model, product capacity, and manufacturing location, to provide a few examples. To this end, in some embodiments, asset to demand matching module 116 can leverage a learning algorithm (e.g., k-nearest neighbor (k-NN) algorithm) and a distance similarity measure algorithm (e.g., Euclidean distance, Manhattan distance, or Minkowsiki distance) to determine a predetermined number of subscription demands (e.g., k subscription demands) that most closely match a returned hardware asset. In such embodiments, the k-NN algorithm may be trained using machine learning techniques with a training dataset generated using relevant features of the subscription demands from the new subscription orders. For example, in one embodiment, the features of the subscription demands from the new subscription orders may be stored or otherwise maintained in a table (e.g., a data structure). In the table, each row (e.g., record) may represent an instance of a training sample (e.g., a particular subscription demand) in the training dataset, and each column may show a different relevant feature of the training sample. That is, each record in the table may represent a particular subscription demand in the training dataset, and each column may contain a relevant feature of the subscription demand represented by the row in the table. For a particular subscription demand and its associated new subscription order, such relevant features may include product model, product capacity, product configuration, customer location, and date of the new subscription order, to provide a few examples.

In more detail, as k-NN is a non-parametric, lazy learning algorithm, the k-NN algorithm does not make any assumptions on the underlying data and doesn't explicitly learn a model. Instead, the k-NN algorithm memorizes the training instances which are subsequently used as knowledge for the prediction phase. That is, the training phase of the k-NN algorithm comprises only of storing the training dataset (e.g., storing a table of subscription demands). For example, in one embodiment, asset to demand matching module 116 may store the training dataset within data repository 118. In some embodiments, data repository 118 may correspond to a storage service within the computing environment of product subscription service 110.

The k-NN algorithm operates on the basic assumption that data points with similar classes are closer to each other. In other words, k-NN makes its selection based on the proximity to the other data points regardless of what feature the numerical values represent. For example, when relevant features of a returned hardware asset are passed (e.g., input) for prediction of similar subscription demands, k records of subscription demands from the training dataset that most closely match the returned hardware asset can be located (e.g., identified). The identified records of subscription demands can be output as a prediction of the most closely matching subscription demands.

In some embodiments, Euclidean distance can be used as a distance measure to measure the similarity between the individual subscription demands and the returned hardware asset. In other embodiments, other measures of similarity, such as Manhattan distance or Minkowsiki distance, can be used as the distance measure. Euclidean distance (also known as 2-norm) is a straight-line distance between two vectors or datapoints (products). Unlike cosine similarity which uses the angle between two datapoints, Euclidean distance can be calculated by simply computing the square root of the sum of the squared differences between the two data points (vectors). The Euclidean distance algorithm may be expressed as follows:

$$\text{Euclidean distance} = \sqrt{\sum_i^N (x1_i - x2_i)^2},$$

where x1 is the first row of data, x2 is the second row of data, and i is the index to a specific column.

A smaller Euclidean distance value means that the two records representing the relevant features of two hardware assets (e.g., a subscription demand and a returned hardware asset) are more similar. A zero Euclidean distance means that both records are the same with all matching attributes and configurations. In response to an input of a record (e.g., a vector) representing relevant features of a returned hardware asset for prediction, asset to demand matching module 116 can predict the most closely matching subscription demands based on the calculated distance between the received record and the individual records representing the relevant features of subscription demands in the training dataset.

Figure 2:
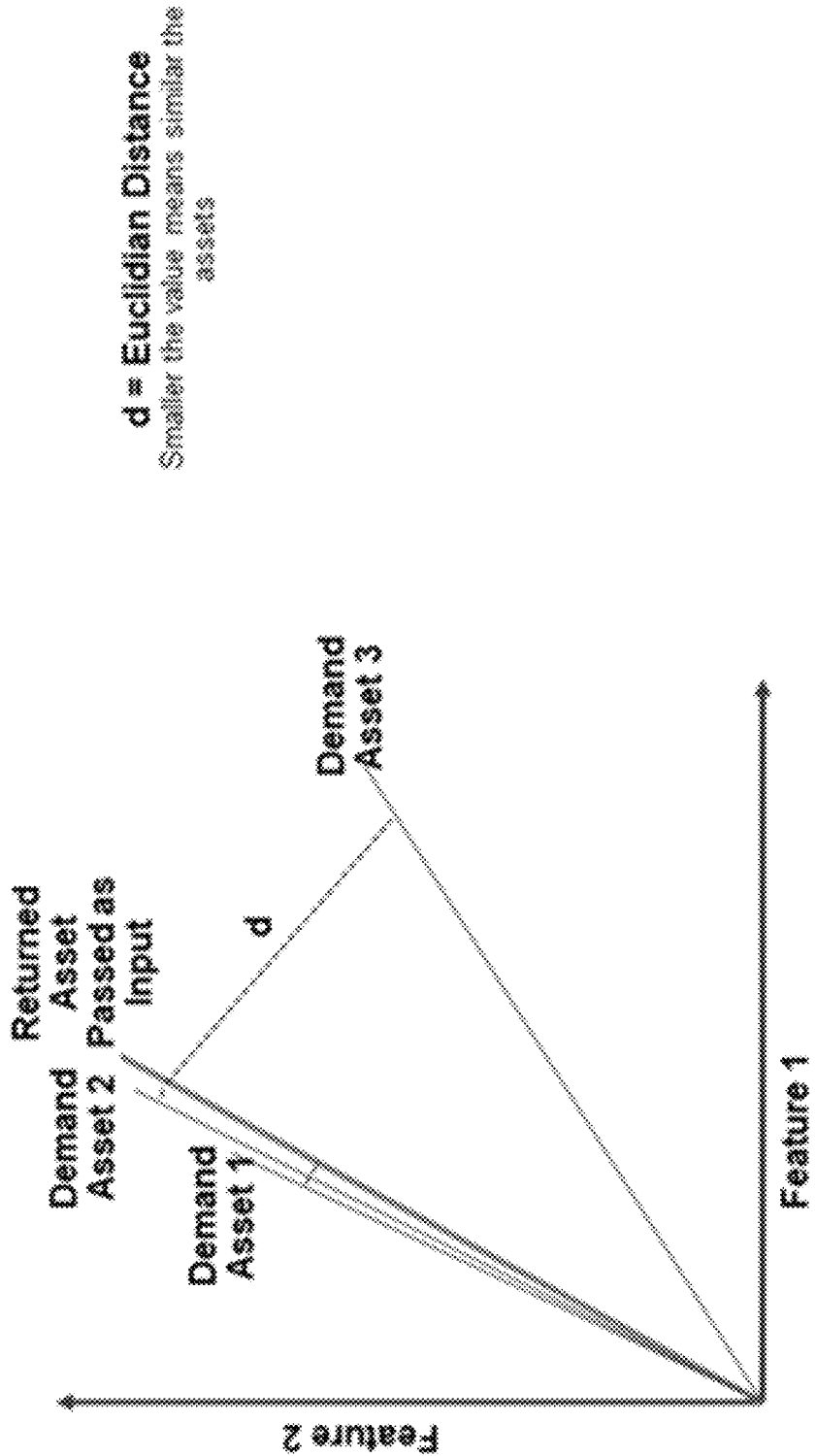
FIG. 2 is a diagram illustrating a matching of records of hardware assets based on Euclidean distance.

For example, in the example illustrated in FIG. 2, a distance (e.g., Euclidian distance) can be calculated between the record representing the returned hardware asset ("Returned Asset Passed as Input") and each of the three (3) records representing the subscription demands ("Demand Asset 1", "Demand Asset 2", and "Demand Asset 3") in the training dataset. Once the distances are calculated, the records in the training dataset can be sorted (or "ordered") based on their distance to the record representing the returned hardware asset. In the example of FIG. 2, based on the calculated Euclidian distance, Demand Asset 2 is nearest the Returned Asset Passed as Input, followed by Demand Asset 1, and then Demand Asset 3. Thus, of the three (3) records in the training dataset, Demand Asset 2 most closely matches the Returned Asset Passed as Input and Demand Asset 3 least matches the Returned Asset Passed as Input. Based on the calculated distances (e.g., order in the training dataset), asset to demand matching module 116 can determine the k records (i.e., k instances) in the training dataset that are closest to the record representing the returned hardware asset, and output these records as the predicted k subscription demands that most closely match the returned hardware asset.

In some embodiments, the predicted number of most closely matching records (e.g., records representing subscription demands), k, may be configured as a hyperparameter and tuned as part of hyperparameter tuning to improve performance of the k-NN model. For example, the value of k may be set to N to cause asset to demand matching module 116 to predict the top N (e.g., N=2, 3, 4, or any other suitable number) most closely matching subscription demands. The value of N may be configurable by the organization. In some embodiments, the predicted top N may be returned or otherwise provided to product subscription processing module 112. In one embodiment, product subscription processing module 112 can output the new subscription orders associated with the predicted top N subscription demands as a recommendation of possible fits for reusing the returned hardware asset.

Referring now to FIG. 3, and with continued reference to FIGS. 1A and 1B, shown is a diagram illustrating a portion of a data structure 300 that can be used to store information about relevant features of a modeling dataset for training a machine learning (ML) classification model to predict whether a hardware asset has reached end-of-life (EOL), in accordance with an embodiment of the present disclosure. More specifically, data structure 300 may be in a tabular format in which the structured columns represent the different relevant features (variables) regarding the historical recycling and reverse logistics data of the organization's hardware assets and a row represents individual historical hardware assets of the organization. The relevant features may be extracted from the historical recycling and reverse logistics data utilizing feature selection and/or data engineering techniques. The relevant features illustrated in data structure 300 are merely examples of features that may be extracted from the historical recycling and reverse logistics data of the organization's hardware assets and used to generate a modeling dataset and should not be construed to limit the embodiments described herein.

As shown in FIG. 3, the relevant features may include a customer 302, a product 304, a part 306, a supplier 308, a manufacture date 310, a manufacture location 312, a customer datacenter location 314, an average CPU utilization 316, an average memory utilization 318, a past issues 320, and an end-of-life 322. Customer 302 indicates a customer who utilized a hardware asset indicated in product 204 of the same row in data structure 300. Product 304 indicates a product number that identifies the hardware asset. Part 306 indicates a part number that identifies a part (or "component") that is included in the hardware asset. Supplier 308 indicates a supplier who supplied or otherwise provided a part included in the hardware asset (e.g., the part indicated in parts 206). Manufacture date 310 indicates the date the hardware asset was manufactured. Manufacture location 312 indicate the location at which the hardware asset was manufactured. Customer datacenter location 314 indicates a location at which the customer utilized the hardware asset (e.g., location of the customer's datacenter at which the hardware asset was utilized). Average CPU utilization 316 indicates the average CPU usage while the hardware asset was being utilized (e.g., % usage of the CPU of the hardware asset). Average memory utilization 318 indicates the average memory usage while the hardware asset was being utilized (e.g., % usage of the memory of the hardware asset). Past issues 320 indicates the number of incidents (e.g., the number of defects and errors) encountered by and/or reported for the hardware asset. End-of-life 322 indicates whether the hardware asset has reached EOL (e.g., "1=Yes") or has not reached EOL (e.g., "0=No"). Note that only one part (e.g., part 306) and one supplier of the part (e.g., supplier 308) are shown as relevant features in FIG. 3 for purposes of clarity, and it will be appreciated that the relevant features can include more than one part and more than one supplier as a hardware asset will typically be configured with more than one part that has influence on the performance of the model (i.e., that are relevant (or influential) in predicting whether a particular hardware asset has reached EOL).

In data structure 300, each row may represent a training/testing sample (i.e., an instance of a training/testing sample) in the modeling dataset, and each column may show a different relevant feature of the training/testing sample. In some embodiments, the individual training/testing samples may be used to generate a feature vector, which is a multi-dimensional vector of elements or components that represent the features in a training/testing sample. In such embodiments, the generated feature vectors may be used for training/testing a ML classification model (e.g., a classification algorithm of asset EOL prediction module 114) to predict whether a hardware asset (e.g., returned hardware asset) has reached EOL. The features customer 302, product 304, part 306, supplier 308, manufacture date 310, manufacture location 312, customer datacenter location 314, average CPU utilization 316, average memory utilization 318, and past issues 320 may be included in a training/testing sample as the independent variables, and the feature end-of-life 322 included as the target variable (or "dependent variable") in the training/testing sample. In some embodiments, data structure 300 may be stored within data repository 118, where it can subsequently be retrieved and utilized to train and test a ML model, such as the ML classification model of asset EOL prediction module 114, for example.

Figure 4:
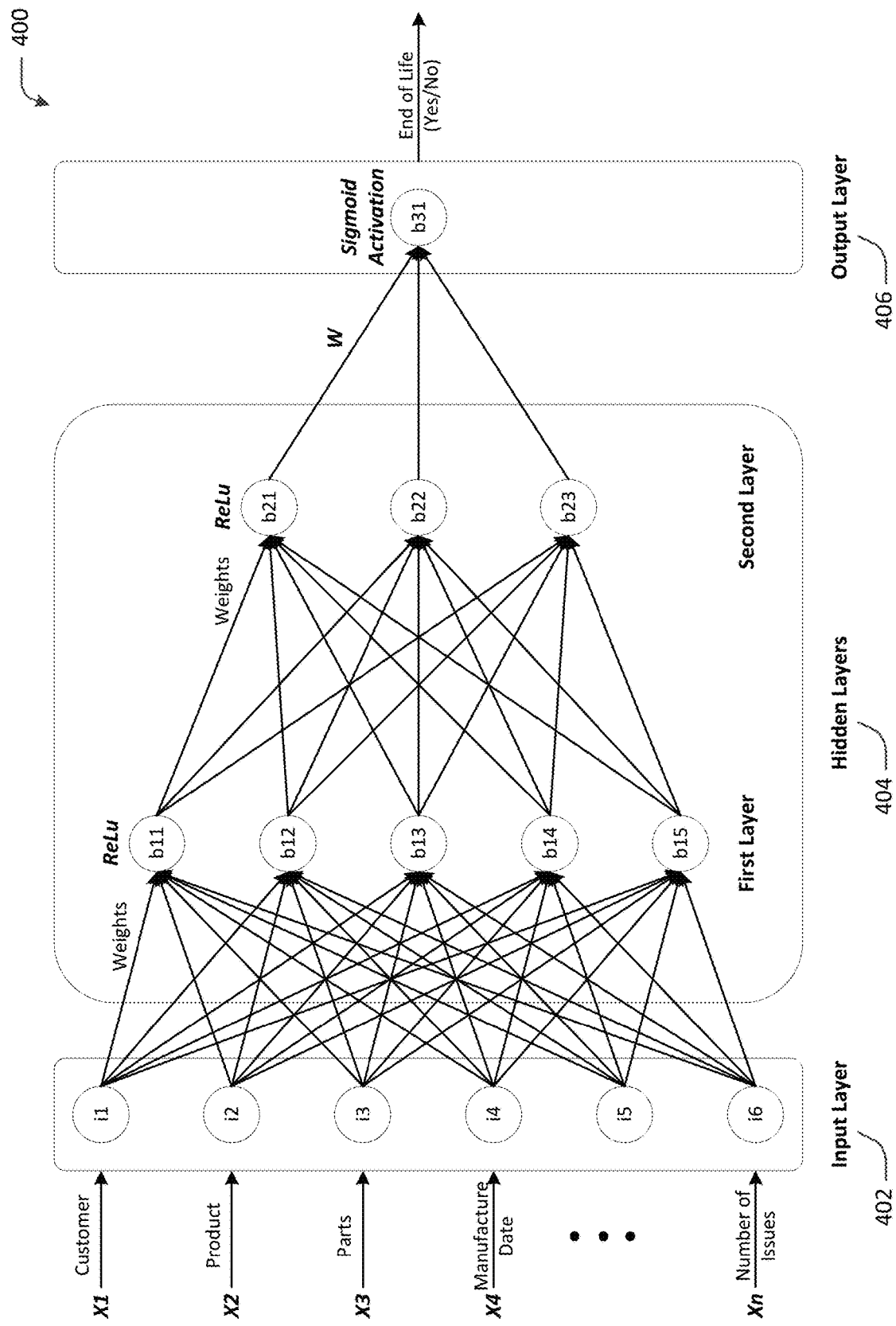
FIG. 4 is a diagram illustrating an example architecture of a dense neural network (DNN) model of an asset end-of-life (EOL) prediction engine, in accordance with an embodiment of the present disclosure.

Referring now to FIG. 4 and with continued reference to FIGS. 1B and 3, illustrated is an example architecture of a dense neural network (DNN)-based classification model of asset EOL prediction module 114, in accordance with an embodiment of the present disclosure. In brief, a DNN includes an input layer for all input variables, multiple hidden layers for feature extraction, and an output layer. Each layer may be comprised of a number of nodes or units embodying an artificial neuron (or more simply a "neuron"). As a DNN, each neuron in a layer receives an input from all the neurons in the preceding layer. In other words, every neuron in each layer is connected to every neuron in the preceding layer and the succeeding layer. As a binary classification model, the output layer is comprised of a single neuron, which outputs a first numerical value (e.g., 1) that represents EOL (i.e., hardware asset has reached EOL) and a second numerical value (e.g., 0) that represents not EOL (i.e., hardware asset has not reached EOL).

In more detail, and as shown in FIG. 4, a DNN 400 includes an input layer 402, multiple hidden layers 404 (e.g., two hidden layers), and an output layer 406. Input layer 402 may be comprised of a number of neurons to match (i.e., equal to) the number of input variables (independent variables). Taking as an example the independent variables illustrated in data structure 300 (FIG. 3), input layer 402 may include 10 neurons to match the 10 independent variables (e.g., customer 302, product 304, part 306, supplier 308, manufacture date 310, manufacture location 312, customer datacenter location 314, average CPU utilization 316, average memory utilization 318, and past issues 320), where each neuron in input layer 402 receives a respective independent variable. Each succeeding layer (e.g., a first layer and a second layer) in hidden layers 404 can further comprise an arbitrary number of neurons, which may depend on the number of neurons included in input layer 402. For example, according to one embodiment, the number of neurons in the first hidden layer may be determined using the relation $2^n \geq$ number of neurons in input layer, where n is the smallest integer value satisfying the relation. In other words, the number of neurons in the first layer of hidden layers 404 is the smallest power of 2 value equal to or greater than the number of neurons in input layer 302. For example, in the case where there are 19 input variables, input layer 302 will include 19 neurons. In this example case, the first layer can include 32 neurons (i.e., $2^5=32$). Each succeeding layer in hidden layers 404 may be determined by decrementing the exponent n by a value of one. For example, the second layer can include 16 neurons (i.e., $2^4=16$). In the case where there is another succeeding layer (e.g., a third layer) in hidden layers 404, the third layer can include eight (8) neurons (i.e., $2^3=8$). As a binary classification model, output layer 406 includes a single neuron.

Although FIG. 4 shows hidden layers 404 comprised of only two layers, it will be understood that hidden layers 404 may be comprised of a different number of hidden layers. Also, the number of neurons shown in the first layer and in the second layer of hidden layers 404 is for illustration only, and it will be understood that actual numbers of neurons in the first layer and in the second layer of hidden layers 404 may be based on the number of neurons in input layer 402.

Each neuron in hidden layers 404 and the neuron in output layer 406 may be associated with an activation function. For example, according to one embodiment, the activation function for the neurons in hidden layers 404 may be a rectified linear unit (ReLU) activation function. As DNN 400 is to function as a binary classification model, the activation function for the neuron in output layer 406 may be a sigmoid activation function.

Since this is a dense neural network, as can be seen in FIG. 4, each neuron in the different layers may be coupled to one another. Each coupling (i.e., each interconnection) between two neurons may be associated with a weight, which may be learned during a learning or training phase. Each neuron may also be associated with a bias factor, which may also be learned during a training process.

During a first pass (epoch) in the training phase, the weight and bias values may be set randomly by the neural network. For example, according to one embodiment, the weight and bias values may all be set to 1 (or 0). Each neuron may then perform a linear calculation by combining the multiplication of each input variables (x1, x2, . . . ) with their weight factors and then adding the bias of the neuron. The equation for this calculation may be as follows:

$$ws1 = x1 \cdot w1 + x2 \cdot w2 + \ldots + b1,$$

where ws1 is the weighted sum of the neuron1, x1, x2, etc. are the input values to the model, w1, w2, etc. are the weight values applied to the connections to the neuron1, and b1 is the bias value of neuron1. This weighted sum is input to an activation function (e.g., ReLU) to compute the value of the activation function. Similarly, the weighted sum and activation function values of all the other neurons in a layer are calculated. These values are then fed to the neurons of the succeeding (next) layer. The same process is repeated in the succeeding layer neurons until the values are fed to the neuron of output layer 406. Here, the weighted sum may also be calculated and compared to the actual target value. Based on the difference, a loss value can be calculated. The loss value indicates the extent to which the model is trained (i.e., how well the model is trained). This pass through the neural network is referred to as a forward propagation, which calculates the error and drives a backpropagation through the network to minimize the loss or error at each neuron of the network. Considering the error/loss is generated by all the neurons in the network, backpropagation goes through each layer from back to forward and attempts to minimize the loss using, for example, a gradient descent-based optimization mechanism or some other optimization method. Since the neural network is used as a binary classifier, binary cross entropy may be used as the loss function, adaptive movement estimation (Adam) as the optimization algorithm, and "accuracy" as the validation metric. In other embodiments, unpublished optimization algorithm designed for neural networks (RMSprop) may be used as the optimization algorithm.

The result of this backpropagation is used to adjust (update) the weight and bias values at each connection and neuron level to reduce the error/loss. An epoch (one pass of the entire training dataset) is completed once all the observations of the training data are passed through the neural network. Another forward propagation (e.g., epoch 2) may then be initiated with the adjusted weight and bias values and the same process of forward and backpropagation may be repeated in the subsequent epochs. Note that a higher loss value means the model is not sufficiently trained. In this case, hyperparameter tuning may be performed. Hyperparameter tuning may include, for example, changing the loss function, changing optimizer algorithm, and/or changing the neural network architecture by adding more hidden layers. Additionally or alternatively, the number of epochs can be also increased to further train the model. In any case, once the loss is reduced to a very small number (ideally close to zero (0)), the neural network is sufficiently trained for prediction.

For example, a DNN 400 can be built by first creating a shell model and then adding a desired number of individual layers to the shell model. For each layer, the number of neurons to include in the layer can be specified along with the type of activation function to use and any kernel parameter settings. Once DNN 400 is built, a loss function (e.g., binary cross entropy), an optimizer algorithm (e.g., Adam or a gradient-based optimization technique such as RMSprop), and validation metrics (e.g., "accuracy") can be specified for training, validating, and testing DNN 400.

DNN 400 can then be trained by passing the portion of the modeling dataset designated for training (e.g., 70% of the modeling dataset designated as the training dataset) and specifying a number of epochs. An epoch (one pass of the entire training dataset) is completed once all the observations of the training data are passed through DNN 400. DNN 400 can be validated once DNN 400 completes the specified number of epochs. For example, DNN 400 can process the training dataset and the loss/error value can be calculated and used to assess the performance of DNN 400. The loss value indicates how well DNN 400 is trained. Note that a higher loss value means DNN 400 is not sufficiently trained.

In this case, hyperparameter tuning may be performed. Hyperparameter tuning may include, for example, changing the loss function, changing optimizer algorithm, and/or changing the neural network architecture by adding more hidden layers. Additionally or alternatively, the number of epochs can be also increased to further train DNN 400. In any case, once the loss is reduced to a very small number (ideally close to 0), DNN 400 is sufficiently trained for prediction. Prediction of the model (e.g., DNN 400) can be achieved by passing the independent variables of test data (i.e., for comparing train vs. test) or the real values that need to be predicted to predict whether a hardware asset has reached EOL (e.g., whether a returned hardware asset has reached EOL).

Figure 5:
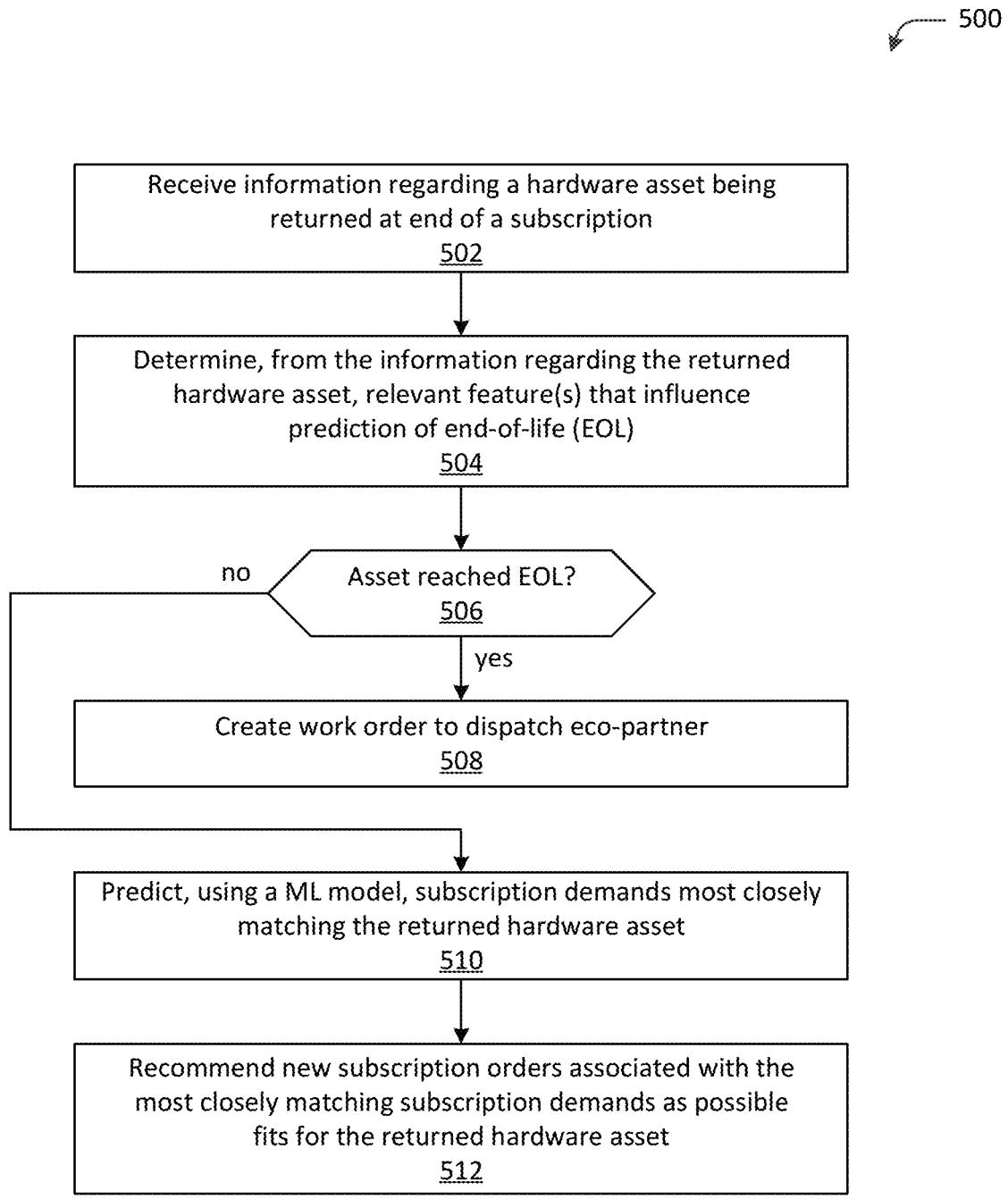
FIG. 5 is a flow diagram of an example process for predicting an end-of-life (EOL) for a returned hardware asset, in accordance with an embodiment of the present disclosure.

FIG. 5 is a flow diagram of an example process 500 for predicting an end-of-life (EOL) for a returned hardware asset, in accordance with an embodiment of the present disclosure. Process 500 may be implemented or performed by any suitable hardware, or combination of hardware and software, including without limitation the components of network environment 100 shown and described with respect to FIGS. 1A and 1B, the computing device shown and described with respect to FIG. 7, or a combination thereof. In some embodiments, process 500 may be implemented, for example, within product subscription service 110 of an organization in response to receiving a notification of a cancellation/termination of a subscription from order management system 108.

With reference to process 500 of FIG. 5, at 502, product subscription service 110 can receive information regarding a hardware asset being returned at the end of the subscription. For example, the information regarding the returned hardware asset can be received with or as part of the notification of the cancellation/termination of the subscription from order management system 108.

At 504, product subscription service 110 can determine relevant feature(s) that influence prediction of end-of-life (EOL) of a hardware asset from the received information regarding the returned hardware asset. For example, product subscription service 110 may perform feature selection and/or data engineering to extract the relevant features from the information regarding the returned hardware asset.

At 506, product subscription service 110 can determine whether the returned hardware asset has reached EOL. Product subscription service 110 may utilize asset EOL prediction module 114 to predict whether the returned hardware asset has reached EOL. For example, product subscription service 110 may generate a feature vector that represents the relevant features extracted from the information regarding the returned hardware asset and send the feature vector with a request to predict whether the returned hardware asset has reached EOL to asset EOL prediction module 114. In response, asset EOL prediction module 114 may input the feature vector to a ML classification model to predict whether the returned hardware asset represented by the feature vector has reached EOL.

If the determination is that the returned hardware asset has reached EOL, then, at 508, product subscription service 110 can create a work order to dispatch an eco-partner to recycle the returned hardware asset. For example, product subscription service 110 may utilize recycling module 120 to create the work order to dispatch the eco-partner to pick-up the returned hardware asset at its current location and to recycle the returned hardware asset.

Otherwise, if the determination is that the returned hardware asset has not reached EOL, then, at 510, product subscription service 110 can determine the subscription demands from new subscriptions orders that most closely match the returned hardware asset. In some embodiments, product subscription service 110 may utilize asset to demand matching module 116 to predict a predetermined number N (e.g., N=3) most closely matching subscription demands. For example, product subscription service 110 may send the feature vector that represents the relevant features extracted from the information regarding the returned hardware asset with a request to predict the top N most closely matching subscription demands to asset to demand matching module 116. In response, asset to demand matching module 116 may utilize a ML model to predict the top N most closely matching subscription demands based on the received feature vector representative of the relevant features of the returned hardware asset. Asset to demand matching module 116 may then return or otherwise provide the predicted top N most closely matching subscription demands to product subscription service 110 (e.g., return information regarding the predicted top N most closely matching subscription demands to product subscription service 110).

In response to information regarding the predicted top N most closely matching subscription demands being received, at 512, product subscription service 110 can determine the new subscription orders associated with the predicted top N most closely matching subscription demands. For example, product subscription service 110 may send or otherwise provide information regarding the new subscription orders associated with the predicted top N most closely matching subscription demands to an order management system (e.g., order management system 108) of the organization as recommended possible fits for reusing the returned hardware asset.

The organization may then determine whether one of the recommended new subscription orders is suitable for reusing the returned hardware asset. If the organization selects one of the recommended new subscription orders, the organization can initiate a reverse logistics workflow to reuse the returned hardware asset for the selected new subscription order. For example, in one embodiment, the organization may utilize reverse logistics module 122 to initiate a reverse logistics workflow to ship the returned hardware asset from its current location to a new customer location specified by the selected new subscription order. Otherwise, if the organization does not select any of the recommended new subscription orders as being suitable for reusing the returned hardware asset, the organization can initiate a workflow for the return of the returned hardware asset (e.g., workflow to ship the returned hardware asset to a fulfillment center).

Figure 6:
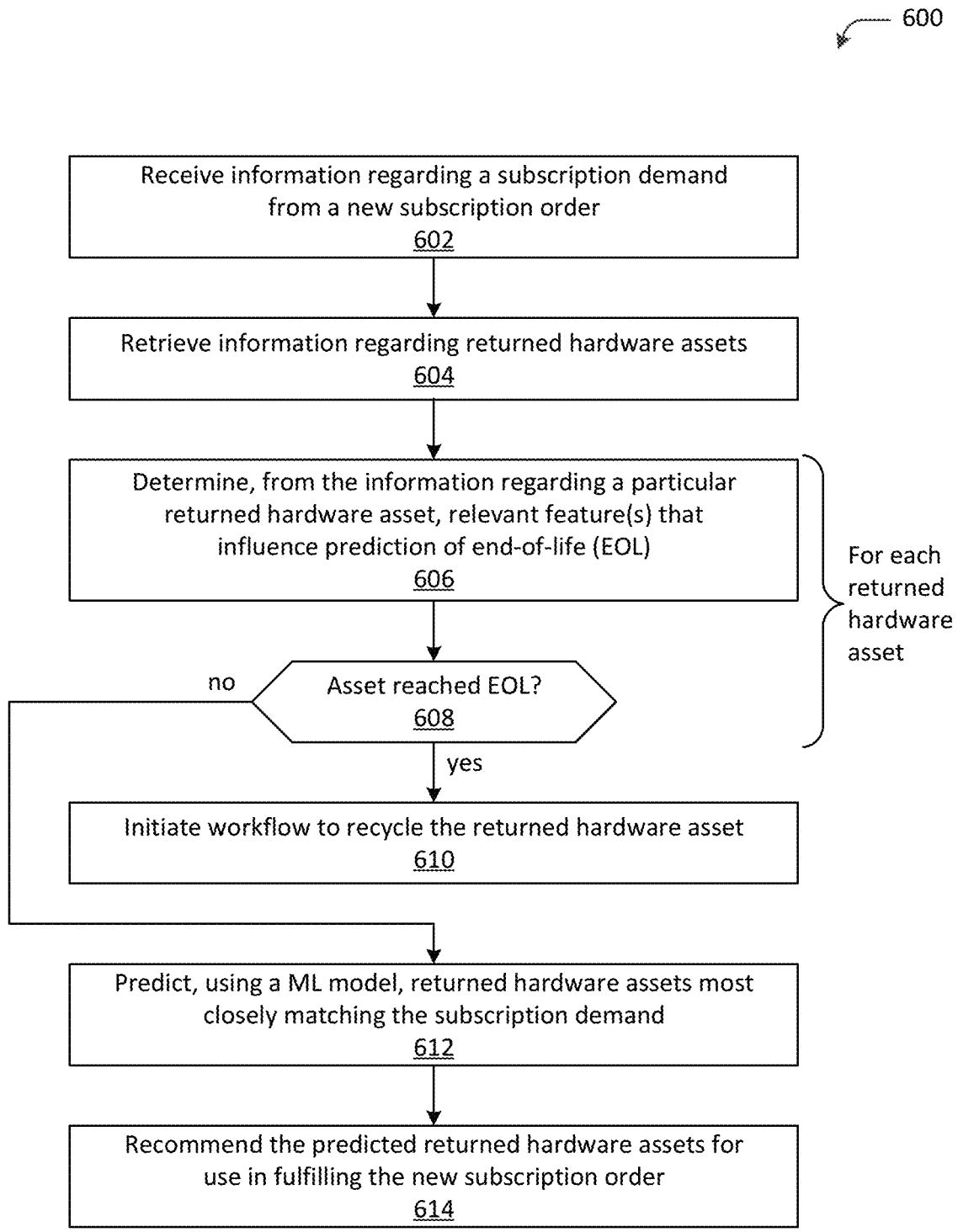
FIG. 6 is a flow diagram of an example process for processing a new subscription order for a hardware asset, in accordance with an embodiment of the present disclosure.

FIG. 6 is a flow diagram of an example process 600 for processing a new subscription order for a hardware asset, in accordance with an embodiment of the present disclosure. Process 600 may be implemented or performed by any suitable hardware, or combination of hardware and software, including without limitation the components of network environment 100 shown and described with respect to FIGS. 1A and 1B, the computing device shown and described with respect to FIG. 7, or a combination thereof. In some embodiments, process 600 may be implemented, for example, within product subscription service 110 of an organization in response to receiving a notification of a new subscription order from order management system 108.

With reference to process 600 of FIG. 6, at 602, product subscription service 110 can receive information regarding a subscription demand from the new subscription order. For example, the subscription demand is the hardware asset that is being ordered by a customer under the new subscription order.

At 604, product subscription service 110 can retrieve information regarding returned hardware assets that are available for use in fulfilling the new subscription order. For example, product subscription service 110 may retrieve the information regarding the available returned hardware assets from data repository 118. Product subscription service 110 can then perform the operations in blocks 606 and 608 for each returned hardware asset available for use in fulfilling the new subscription order.

At 606, product subscription service 110 can determine whether a particular returned hardware asset has reached EOL. Product subscription service 110 may utilize asset EOL prediction module 114 to predict whether the returned hardware asset has reached EOL. For example, product subscription service 110 may generate a feature vector that represents the relevant features extracted from the information regarding the returned hardware asset and send the feature vector with a request to predict whether the returned hardware asset has reached EOL to asset EOL prediction module 114. In response, asset EOL prediction module 114 may input the feature vector to a ML classification model to predict whether the returned hardware asset represented by the feature vector has reached EOL.

If the determination is that the returned hardware asset has reached EOL, then, at 608, product subscription service 110 can initiate a workflow to recycle the returned hardware asset. For example, product subscription service 110 may utilize recycling module 120 to create the work order to dispatch the eco-partner to recycle the returned hardware asset.

At 612, from the returned hardware assets that have not reached EOL, product subscription service 110 can determine the returned hardware assets most closely matching the subscription demand. In some embodiments, product subscription service 110 may utilize machine learning techniques similar to the machine learning techniques implemented by asset to demand matching module 116 previously described herein, to predict a predetermined number K (e.g., K=5) most closely matching returned hardware assets.

At 614, product subscription service 110 can recommend the predicted top K most closely matching returned hardware assets for use in fulfilling the new subscription order. For example, product subscription service 110 may send or otherwise provide information regarding the predicted top K most closely matching returned hardware assets to an order management system (e.g., order management system 108) of the organization as recommended hardware assets for use in fulfilling the new subscription order.

FIG. 7 is a block diagram illustrating selective components of an example computing device 700 in which various aspects of the disclosure may be implemented, in accordance with an embodiment of the present disclosure. As shown, computing device 700 includes one or more processors 702, a volatile memory 704 (e.g., random access memory (RAM)), a non-volatile memory 706, a user interface (UI) 708, one or more communications interfaces 710, and a communications bus 712.

Non-volatile memory 706 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 708 may include a graphical user interface (GUI) 714 (e.g., a touchscreen, a display, etc.) and one or more input/output (I/O) devices 716 (e.g., a mouse, a keyboard, a microphone, one or more speakers, one or more cameras, one or more biometric scanners, one or more environmental sensors, and one or more accelerometers, etc.).

Non-volatile memory 706 stores an operating system 718, one or more applications 720, and data 722 such that, for example, computer instructions of operating system 718 and/or applications 720 are executed by processor(s) 702 out of volatile memory 704. In one example, computer instructions of operating system 718 and/or applications 720 are executed by processor(s) 702 out of volatile memory 704 to perform all or part of the processes described herein (e.g., processes illustrated and described in reference to FIGS. 1 through 6). In some embodiments, volatile memory 704 may include one or more types of RAM and/or a cache memory that may offer a faster response time than a main memory. Data may be entered using an input device of GUI 714 or received from I/O device(s) 716. Various elements of computing device 700 may communicate via communications bus 712.

The illustrated computing device 700 is shown merely as an illustrative client device or server and may be implemented by any computing or processing environment with any type of machine or set of machines that may have suitable hardware and/or software capable of operating as described herein.

Processor(s) 702 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 702 may be analog, digital or mixed signal. In some embodiments, processor 702 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 710 may include one or more interfaces to enable computing device 700 to access a computer network such as a Local Area Network (LAN), a Wide Area Network (WAN), a Personal Area Network (PAN), or the Internet through a variety of wired and/or wireless connections, including cellular connections.

In described embodiments, computing device 700 may execute an application on behalf of a user of a client device. For example, computing device 700 may execute one or more virtual machines managed by a hypervisor. Each virtual machine may provide an execution session within which applications execute on behalf of a user or a client device, such as a hosted desktop session. Computing device 700 may also execute a terminal services session to provide a hosted desktop environment. Computing device 700 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:

training, at a product subscription service, a first machine learning (ML) model to predict whether a hardware asset has or has not reached end-of-life (EOL) using a training dataset composed of a plurality of training samples, each training sample of the plurality of training samples corresponding to historical recycling and reverse logistics data, each training sample of the plurality of training samples to adjust weights in the first ML model, wherein training the first ML model includes inputting different portions of the training dataset and comparing predictions of EOL with actual target values of the training samples to adjust weights in the first ML model;

receiving, by the product subscription service, information regarding a hardware asset being returned at an end of a subscription;

determining, by the product subscription service, one or more relevant features from the information regarding the hardware asset, the one or more relevant features including hardware performance data and influencing prediction of the EOL;

generating, by the product subscription service, a feature vector including the one or more relevant features;

inputting, by the product subscription service, the feature vector to the first ML model;

predicting, by the product subscription service using the first ML model, whether the hardware asset has reached EOL based on the one or more relevant features; and responsive to predicting that the hardware asset has reached EOL, creating, by the product subscription service, a work order to dispatch an eco-partner.

2. The method of claim 1, wherein the first ML model includes a deep neural network (DNN)-based classifier.

3. The method of claim 1, wherein the work order dispatches the eco-partner to a customer location to pick-up the hardware asset.

4. The method of claim 1, further comprising, responsive to predicting that the hardware asset has not reached EOL:

predicting, by the product subscription service using a second ML model, one or more subscription demands matching the hardware asset; and recommending, by the product subscription service, one or more new subscription orders associated with the predicted one or more subscription demands as possible fits for the hardware asset.

5. The method of claim 4, wherein the second ML model includes a k-nearest neighbor (k-NN) classifier.

6. The method of claim 4, wherein the one or more subscription demands are predicted using one of Euclidean distance, Manhattan distance, or Minkowsiki distance.

7. The method of claim 4, further comprising, responsive to selection of one of the recommended one or more new subscription orders, initiating, by the product subscription service, a reverse logistics workflow for the selected one of the recommended one or more new subscription orders.

8. The method of claim 4, further comprising, responsive to selection of none of the recommended one or more new subscription orders, initiating, by the product subscription service, a workflow for return of the hardware asset.

9. The method of claim 1 wherein the first ML model is a binary classification model.

10. The method of claim 9 wherein the first ML model comprises a rectified linear unit activation function.

11. A system comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

training a first machine learning (ML) model to predict whether a hardware asset has or has not reached end-of-life (EOL) using a training dataset composed of a plurality of training samples, each training sample of the plurality of training samples corresponding to historical recycling and reverse logistics data, each training sample of the plurality of training samples to adjust weights in the first ML model, wherein training the first ML model includes inputting different portions of the training dataset and comparing predictions of EOL with actual target values of the training samples to adjust weights in the first ML model;

receiving information regarding a hardware asset being returned at an end of a subscription;

determining one or more relevant features from the information regarding the hardware asset, the one or more relevant features including hardware performance data and influencing prediction of the EOL;

generating, by the product subscription service, a feature vector including the one or more relevant features;

inputting, by the product subscription service, the feature vector to the first ML model;

predicting, using the first ML model, whether the hardware asset has reached EOL based on the one or more relevant features; and responsive to predicting that the hardware asset has reached EOL, creating a work order to dispatch an eco-partner.

12. The system of claim 11, wherein the first ML model includes a deep neural network (DNN)-based classifier.

13. The system of claim 11, wherein the work order dispatches the eco-partner to a customer location to pick-up the hardware asset.

14. The system of claim 11, wherein the process further comprises, responsive to predicting that the hardware asset has not reached EOL:

predicting, using a second ML model, one or more subscription demands matching the hardware asset; and recommending one or more new subscription orders associated with the predicted one or more subscription demands as possible fits for the hardware asset.

15. The system of claim 14, wherein the second ML model includes a k-nearest neighbor (k-NN) classifier.

16. The system of claim 14, wherein the one or more subscription demands are predicted using one of Euclidean distance, Manhattan distance, or Minkowsiki distance.

17. The system of claim 14, wherein the process further comprises, responsive to selection of one of the recommended one or more new subscription orders, initiating a reverse logistics workflow for the selected one of the recommended one or more new subscription orders.

18. The system of claim 14, wherein the process further comprises, responsive to selection of none of the recommended one or more new subscription orders, initiating a workflow for return of the hardware asset.

19. A method comprising:

training, at a product subscription service, a machine learning (ML) model to predict whether a returned hardware asset matches a subscription demand using a training dataset composed of a plurality of training samples, each training sample of the plurality of training samples corresponding to historical subscription demand data, each training sample of the plurality of training samples to adjust weights in the ML model, wherein training the ML model includes inputting different portions of the training dataset and comparing predictions of matches with actual target values of the training samples to adjust weights in the ML model;

receiving, by the product subscription service, information regarding a subscription demand from a new subscription order;

retrieving, by the product subscription service, information regarding a plurality of returned hardware assets, the information including hardware performance data and influencing prediction of an end-of-life (EOL);

generating, by the product subscription service, a feature vector including one or more relevant features from the plurality of returned hardware assets;

inputting, by the product subscription service, the feature vector to the ML model;

predicting, by the product subscription service using the ML model, one or more of the plurality of returned hardware assets matching the subscription demand, wherein the one or more of the plurality of returned hardware assets have not reached (EOL); and recommending, by the product subscription service, the one or more matching returned hardware assets for use in fulfilling the new subscription order.

20. The method of claim 19, wherein the ML model includes a k-nearest neighbor (k-NN) classifier.

* * * * *